(12) United States Patent
Peddicord

(10) Patent No.: US 9,850,143 B2
(45) Date of Patent: Dec. 26, 2017

(54) ELEVATED WELL FOR BRINE TANK IN WATER SOFTENER

(71) Applicant: Donald B. Peddicord, Durant, OK (US)

(72) Inventor: Donald B. Peddicord, Durant, OK (US)

( * ) Notice: Subject to any disclaimer, the term of this patent is extended or adjusted under 35 U.S.C. 154(b) by 513 days.

(21) Appl. No.: 14/592,952

(22) Filed: Jan. 9, 2015

(65) Prior Publication Data

US 2016/0200596 A1    Jul. 14, 2016

(51) Int. Cl.
  *C02F 1/42*  (2006.01)
  *C02F 1/00*  (2006.01)
  *B01J 49/75*  (2017.01)

(52) U.S. Cl.
  CPC .............. *C02F 1/42* (2013.01); *C02F 1/008* (2013.01); *B01J 49/75* (2017.01); *C02F 2201/002* (2013.01); *C02F 2201/004* (2013.01); *C02F 2201/005* (2013.01); *C02F 2209/001* (2013.01); *C02F 2209/40* (2013.01); *C02F 2209/42* (2013.01); *C02F 2303/16* (2013.01)

(58) Field of Classification Search
  CPC ............. C02F 1/008; C02F 1/42–1/427; C02F 2201/002; C02F 2201/004; C02F 2201/005; C02F 2201/007; C02F 2209/001; C02F 2209/40; C02F 2209/42; C02F 2303/16; B01J 49/75

See application file for complete search history.

(56) References Cited

U.S. PATENT DOCUMENTS

| 2,627,503 | A |   | 2/1953  | Anderson |
|-----------|---|---|---------|----------|
| 2,820,419 | A | * | 1/1958  | Albertson ............... C01B 33/46 137/391 |
| 2,874,717 | A | * | 2/1959  | Johnson .................... C02F 1/42 137/391 |
| 3,049,238 | A |   | 8/1962  | Whitlock |
| 3,215,273 | A |   | 11/1965 | Kryzer |
| RE26,343  | E | * | 2/1968  | Reid et al. ............... C02F 1/42 210/277 |
| 3,374,891 | A |   | 3/1968  | Buchmann |
| 3,465,880 | A |   | 9/1969  | Lyall |
| 4,026,801 | A |   | 5/1977  | Ward |
| 4,228,000 | A |   | 10/1980 | Hoeschler |
| 5,651,880 | A |   | 7/1997  | Johnson |
| 6,863,808 | B2|   | 3/2005  | Fullmer et al. |

(Continued)

*Primary Examiner* — Terry Cecil
(74) *Attorney, Agent, or Firm* — Law Office of William Gustavson, PC

(57) ABSTRACT

A well (18) is mounted on an extension (12) of a brine tank (10) in a water softener system. The extension (12) can be molded integrally with the brine tank (10), or separate from the brine tank (10) and mounted thereto by fasteners (24). The extension (12) extends above the horizontal plane (14) at the upper edge (16) of the brine tank (10) and the well (18) is mounted to the extension (12) above the horizontal plane (14). A riser (20) is mounted to the extension (12) for external connection and extends into the well (18). All necessary connections to components in the well (18) are made through the extension (12) above the horizontal plane (14) so that no passages need be made through the wall (22) of the brine tank (10). Also, the upper end of the well (18) is above the horizontal plane (14) to facilitate servicing.

17 Claims, 3 Drawing Sheets

(56) References Cited

U.S. PATENT DOCUMENTS

| | | | |
|---|---|---|---|
| 7,087,162 B2 * | 8/2006 | Peddicord | B01J 49/75 210/190 |
| 7,297,264 B2 | 11/2007 | Sebastian | |
| 7,815,794 B2 | 10/2010 | Muniak | |

* cited by examiner

ELEVATED WELL FOR BRINE TANK IN WATER SOFTENER

TECHNICAL FIELD OF THE INVENTION

This invention relates to water softeners using salt, and in particular to a brine tank having a well or control center.

BACKGROUND OF THE INVENTION

Water softeners find wide applications throughout society. In many applications, it is desirable to soften the water by removing the hardness materials, such as calcium and magnesium, from the water before use. This is particularly critical in boiler operations when use of hard water will create boiler scale and rapidly reduce operating efficiencies.

A common water softening process is to use a stand alone water softening tank designed for this purpose. A water softening tank contains cation exchange resin capable of exchanging hardness ions, i.e, calcium and magnesium, for sodium ions which are very soluble. Water to be treated flows in one end of the tank, is treated as it passes through the exchange resin to remove the hardness materials, and flows out of the tank as soft water.

After a certain period of use, the hardness exchanging capacity of the water softening resin becomes exhausted, and it stops producing soft water. It then becomes necessary to regenerate the resin with a saturated solution of sodium or potassium chloride. Because of costs, sodium chloride is usually the chemical of choice. The saturated solution is passed through the resin and the calcium and magnesium ions are replaced by sodium ions to regenerate the resin. The saturated solution now containing the hardness materials is treated as waste water.

Sodium chloride brine solution is created in a separate tank built and designed for this purpose and this tank is called a brine tank. Modern water softeners are well engineered and designed to produce soft water with all regeneration actions done automatically, including the transfer of the saturated brine from the brine tank to the water softening tank.

In order for the water softener resin to be properly rejuvenated, the saturated brine solution must be of a high quality, and a measured volume must be delivered whenever needed. A properly designed and engineered brine tank will provide these needs by delivering a measured quantity of saturated salt brine containing a fixed amount of dissolved salt per gallon of water. This is accomplished by using a horizontal salt grid in a vertical tank positioned at a predetermined height in the tank. Granular salt is supported on this salt grid and the salt fills most of the volume of the brine tank above the grid. The height and diameter of the salt grid varies for each softening system, depending on many factors, but in all cases the height of the grid sets the volume of water in the brine tank. In actual practice, the brine system is set to fill the brine tank with fresh water from the bottom of the tank to approximately one inch above the salt grid and then shut off. Using this method, only one inch of water touches the vertically extending salt pile, which may be several hundred pounds in weight, supported on top of the salt grid.

This system is called a dry salt shelf system, as opposed to a wet salt brine tank system where most or all of the salt is immersed in water. The dry salt shelf system has significant advantages over the wet salt system. The dry salt shelf method produces 100% saturated brine (specific gravity 1.2) all the time where wet salt methods do not. The dry salt shelf system affects more dry salt storage in the same size brine tank than a wet salt system. A dry salt shelf system is easier to keep clean than the wet salt system. A dry salt shelf system does not require a gravel support bed on the bottom of the brine tank. The dry salt shelf system offers lower maintenance costs to the operator, no gravel cleaning or replacement.

The dry salt shelf system uses a brine float or refill valve in the lower section of the brine tank (below the salt grid). The brine refill valve is connected to a riser (a pipe) which extends upwardly to near the top of the brine tank and opens outside the brine tank. Water is both supplied to the brine tank, and removed from the brine tank, through this riser when the refill valve is open. For example, when the brine tank requires filling, fresh water is provided through the riser to the valve to fill the brine tank to a level slightly above the salt grid. A float, operably connected with the brine refill valve, will cause the valve to close when the predetermined quantity of water has been supplied to the tank. After becoming saturated, the water, now a brine solution, is removed through the same riser, past the valve, by drawing a suction in the riser and delivered to the water softening tank to regenerate the resin.

The valve, float and riser are normally positioned within a well (usually a vertical PVC tube), sometimes called a control center, within the brine tank to help isolate these elements from the salt within the tank. The well is typically a vertical PVC pipe, extending from a point 6 to 8 inches below the top of the tank down into the tank to a level somewhat below the salt grid. The top of the well may have a cap to keep salt out of the well interior which might interfere with valve operation. The riser passes through the wall of the well and wall of the tank below the top of the well for external connection.

While this system has worked well, servicing of the valve, float and riser within the well is a complicated procedure. A typical brine tank may be 60 inches tall and 50 inches in diameter. If the brine tank is completely full of salt, salt may in fact cover over the cap on the top of the well near the top of the tank, requiring service personnel to dig down through the salt to reach the cap and remove it to access the well. Service personnel will be required to reach from the top of the brine tank to near the bottom of the tank to service the brine refill valve and float. The salt grid, where the float will be commonly located, may only be 12 inches off the bottom of the tank. The valve itself may rest on the bottom of the tank. A need exists for an improved design providing greater efficiency and more ready accessibility to these components for servicing and repair.

SUMMARY OF THE INVENTION

In accordance with one aspect of the present invention, an apparatus is provided including a brine tank, the brine tank having a first portion for containing salt and a brine solution, the first portion having an upper edge defining a horizontal plane. The brine tank further has an extension mounted to the first portion and extending above the upper edge. The apparatus further including a well. The well is mounted to the brine tank at the extension above the upper edge of the first portion, a portion of the well extending above the horizontal plane.

In accordance with another aspect of the present invention, the extension is formed integrally with the first portion. In accordance with another aspect of the present invention, the extension is separate from the first portion and is mounted to the first portion by adhesive or fasteners.

In accordance with another aspect of the present invention, the first portion and extension are molded plastic. In accordance with another aspect of the present invention, the apparatus further includes a lid, the lid mating with the upper edge of the first portion, the lid having an inset to accommodate the well.

In accordance with another aspect of the present invention, the apparatus includes a riser, the riser extending within the well and passing through the well and extension above the horizontal plane. In accordance with another aspect of the present invention, the apparatus includes a brine refill valve and a float within the well, the riser connected to the brine refill valve. The float is positioned in the well for vertical movement determined by the water level in the well, the float operating the brine refill valve to control water flow into the well.

In accordance with another aspect of the present invention, the apparatus includes a salt platform mounted within the brine tank supporting a quantity of salt, the salt platform being at a predetermined height within the brine tank.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Figure 1:
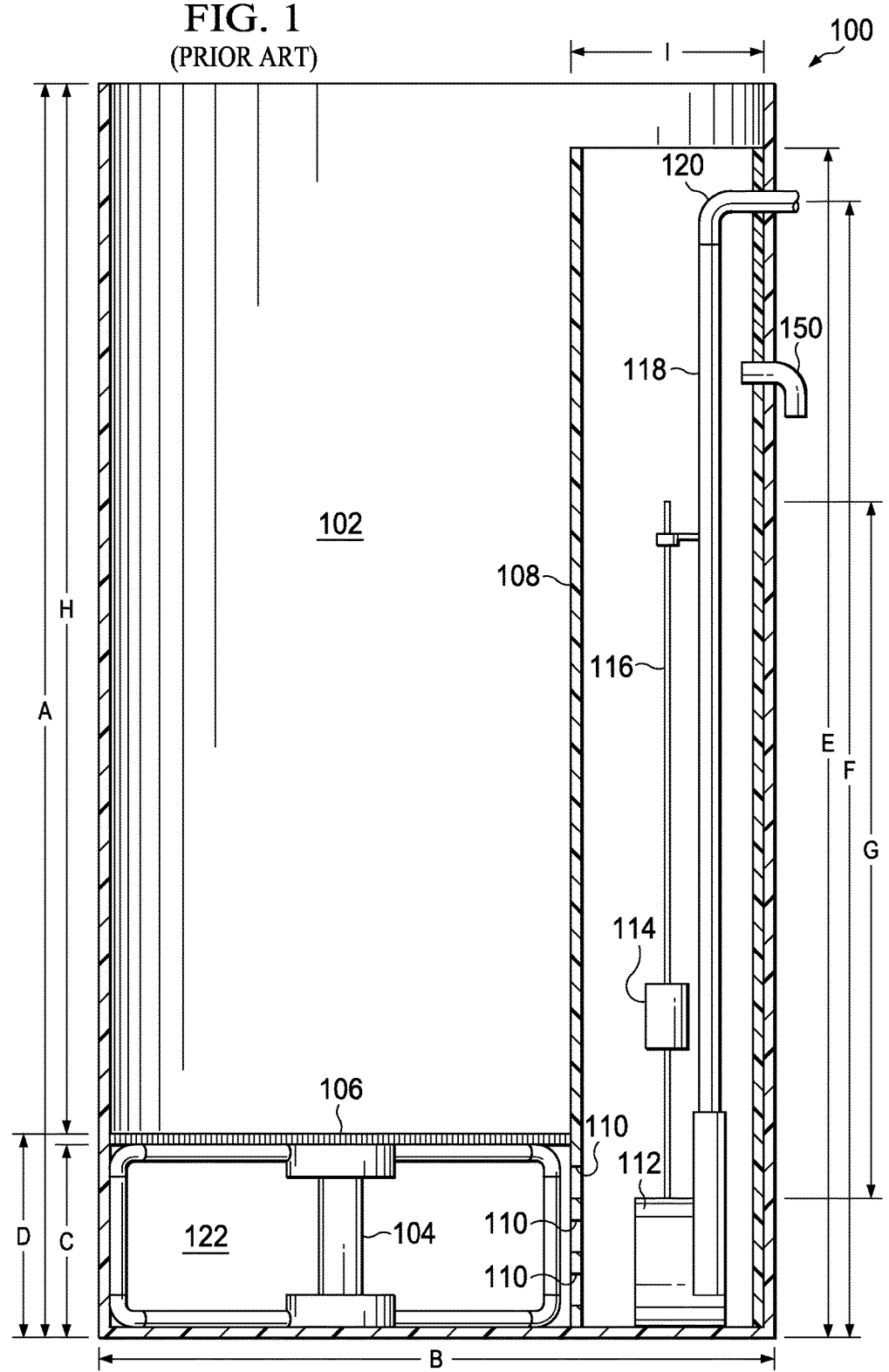
FIG. 1 is a cross-sectional view of a brine tank with a well common in the prior art.

With reference now to the accompanying drawings, wherein like or corresponding parts are designated by the same reference numeral, FIG. 1 illustrates a typical prior art brine tank 100. Brine tank 100 is a cylindrical tank having height A and a diameter B. Alternatively, tank 100 can be square. Positioned within the tank interior 102 is a salt platform 104 supporting a salt grid 106. Salt will normally be contained in the portion of interior 102 designated by the letter H. The salt will be supported on the salt grid 106.

A well 108, typically formed of a hollow pipe or tube of diameter I and height E will be mounted on an interior surface of the tank 100, within the interior 102. A series of apertures 110 near the lower end of the well 108 allow fluid flow between the interior of the well 108 and the remainder of the interior 102.

Within the well 108 is mounted a brine refill valve 112 which is operated by a float 114 through a float rod 116. A riser 118 extends from the valve 112 to near the top of the well 108 where it is provided with an elbow 120 and extends through the wall of the tank 100 exterior of the tank. The rod 116 extends a distance G above the valve 112 at the bottom of the tank 100 while the riser extends to a height F above the bottom of the tank.

In one design of the type illustrated, the tank height A is 60 inches. The tank diameter B is 50 inches. Space 122 below the salt grid, having height C, has a height of 12 inches. The distance D from the bottom of the tank to the top of the salt grid 106, is 12¼ inches. The height E of the well 108 is 56 inches. The height F to the top of the riser 118 is 52 inches. The rod length G is 40 inches, with the float about 16 inches from the bottom and 36 inches from the top of the well. The height of salt storage H is about 48 inches while the diameter I of the well 108 is about 6¼ inches. The tank can be filled with 3434 pounds of salt if filled even with a well cap closing off the top of the well 108 or about 3700 pounds if filled over the well cap to the top of the tank.

As previously noted, operation of the tank 100 is facilitated by well known components outside the tank. When water is required in the tank 100, these exterior components cause water to flow to elbow 120, to the riser 118, through the valve 112 and into the holding space 122 through the apertures 110. The float 114 and float rod 116 rise as the water level rises in the well 108 until the desired level is reached, upon which the float rod 116 closes the brine refill valve 112 to prevent additional water from entering the tank 100. The tank 100 usually has an overflow connection 150 which is routed to a drain or sewer in the event the valve 112 fails and the tank 100 overfills. An overflow connection 150 is used in tank 100 regardless if the float is used as the cut-off valve where it is under pressure at all times, or as a safety float when used in conjunction with timed refill. When water is to be removed, a suction is drawn in the riser 118, causing the valve 112 to open against the resistance of the float 114 and draw water from the holding space 122. It should be noted that, while the water level is meant to be about one inch above the salt grid 106, the salt displacement causes the water to rise to a higher level within the well 108 where the float is positioned, for example, five or so inches above the water level outside of the well 108. An alternative design can use an air check. While these designs function adequately, it is very difficult to service the components within the well 108.

Figure 2:
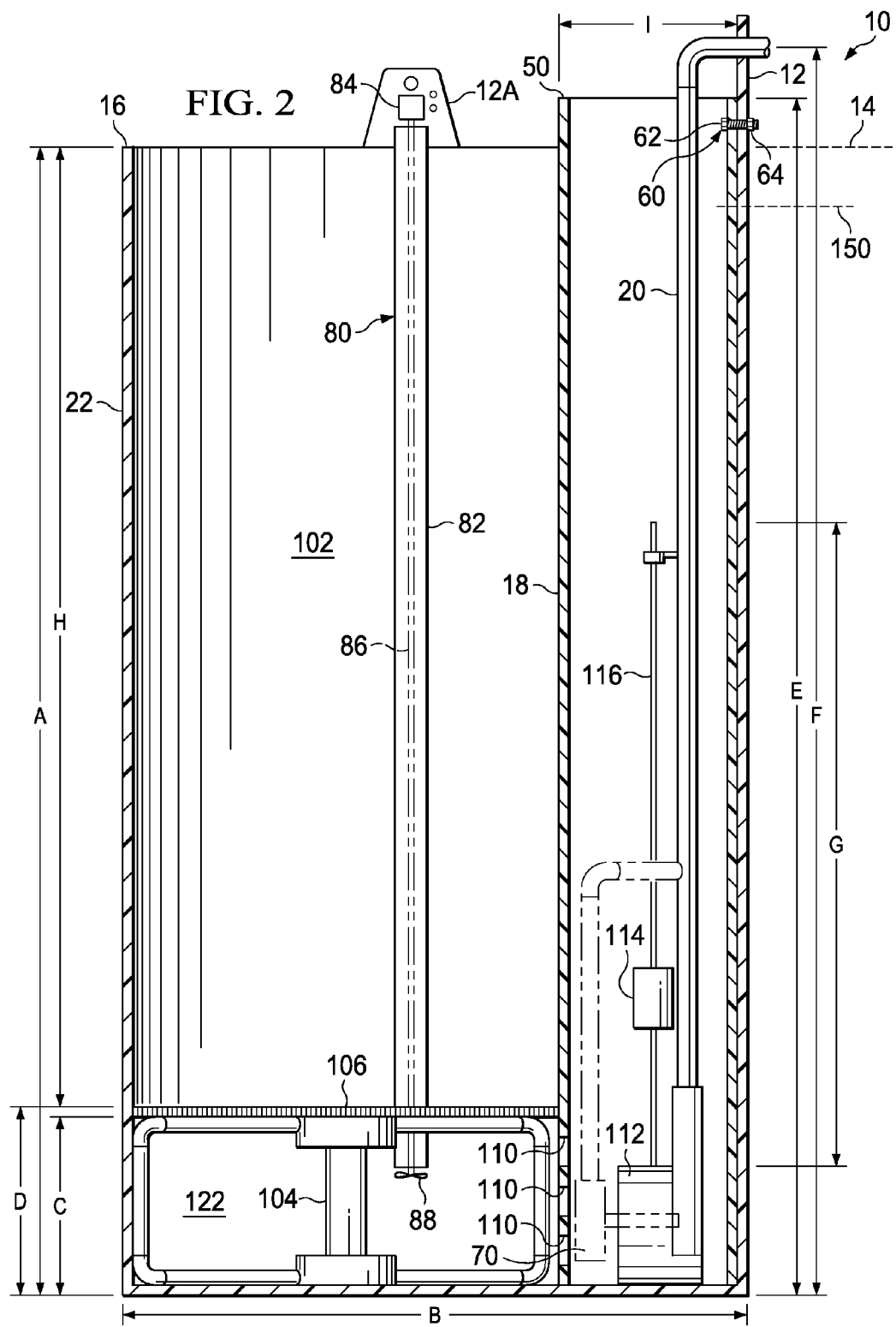
FIG. 2 is a cross-sectional view of a first embodiment of the present invention illustrating an elevated well mounted to an extension in a brine tank.

With reference now to FIG. 2, a first embodiment of the present invention will be described. A brine tank 10 is provided with an extension 12 which extends above the horizontal plane 14 at the upper edge 16 of the top of the brine tank 10. The brine tank 10 and extension 12 can be made of fiberglass, polyethylene, polypropylene or other plastic materials. A well 18 is mounted to the extension 12 above the horizontal plane 14 and extends down into the tank 10. For example, one or more nylon fasteners 60, each including bolt 62 and nut 64, can secure the well 18 to the extension 12 above the horizontal plane 14. A riser 20 is connected through the wall of the extension 12 above the horizontal plane 14 for connection to external lines and extends downward within the well 18 to the brine refill valve 112. Structure in FIG. 2 identified by the same reference numeral as in FIG. 1 is identical to and functions in the same manner as the structure described above with reference to FIG. 1.

By use of the extension 12, no ports need be formed through the wall 22 of the brine tank 10 other than overflow connection 150. By supporting the well 18 above the horizontal plane 14, full utilization of the entire interior volume 102 of the tank 10 up to the horizontal plane 14 is possible, making it possible to allow shorter tanks to be employed where desired or have the capacity of a given tank height be enhanced. In the design of tank 100, it was often impossible to fill the tank 100 with salt above the level of the top of the well 108. If a cap were placed on the top of the well 108 to allow additional salt to be filled into tank 100, the well 108 would be buried under the salt, making it difficult to access the well 108 for service. In brine tank 10, the entire interior 102 of the tank 10 up to the horizontal plane 14 can be filled with salt, and the upper end 50 of the well 18 is always accessible, allowing easy servicing of the components therein, such as the float 114 and fill valve 112. The upper end 50 can be about 3 inches above horizontal plane 14, for example.

Figure 4:
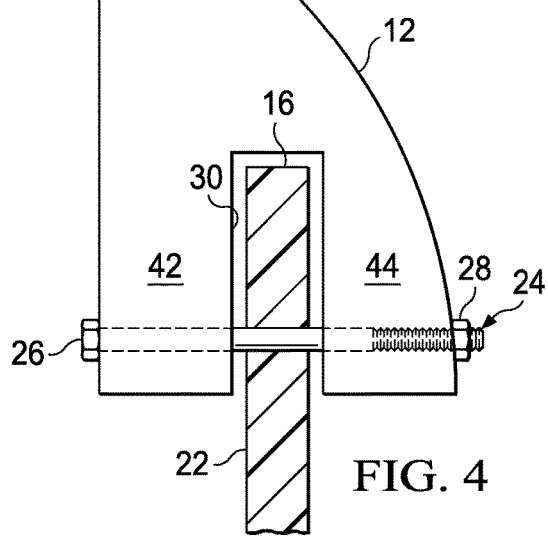
FIG. 4 is a detail view of an extension for mounting on the brine tank with fasteners in the present invention.
Figure 5:
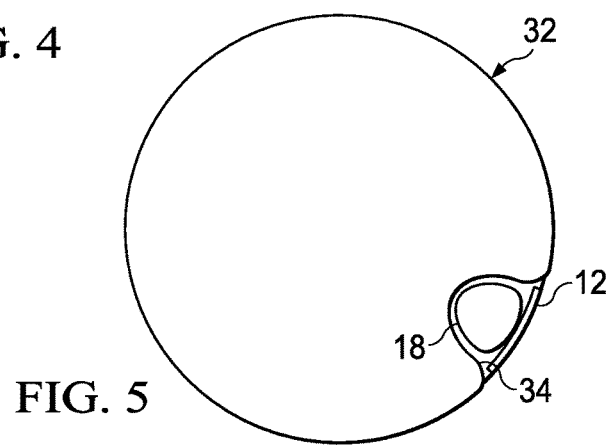
FIG. 5 is a plan view of a lid having an inset to accommodate the well in the present invention.

The extension 12 can be formed integrally with the brine tank 10, as seen in FIG. 2, preferably by molding the extension 12 and tank 10 as a single molded unit to reduce labor cost, or can be separate from the brine tank 10 and attached to the brine tank 10 by fasteners 24 such as threaded bolts 26 and nuts 28, as seen in FIG. 4. An adhesive can be used to attach extension 12 to brine tank 10 to supplement fasteners 24 or instead of fasteners 24, if desired. The extension 12 can be mounted to the tank 10 by hinges, if desired. If separate from the tank 10, the extension 12 can have a recess 30 to receive the upper edge 16 of the tank 10 for a more secure mounting. The extension 12 can be made of fiberglass, polyethylene, polypropylene or other plastic materials. The recess 30 could be about ¼ wide, for example. The portions 42 and 44 receiving the fasteners on either side of the recess 30 could be about ¼ inch and ½ inch thick, respectively A lid 32 is provided for the brine tank 10, as seen in FIG. 5, which engages the upper edge 16 of the tank 10 about its entire circumference except where the well 18 is mounted. The lid 32 has a inset 34 to provide clearance for the well 18 such that the lid 32 can fit on the upper edge 16 of the tank 10 to protect the interior of the tank 10 from external contaminants and to reinforce the tank 10. The lid 32 is relatively loose fitting, allowing the escape of heat and humidity from the tank interior in warmer sections of the country and in hot boiler rooms.

Figure 3:
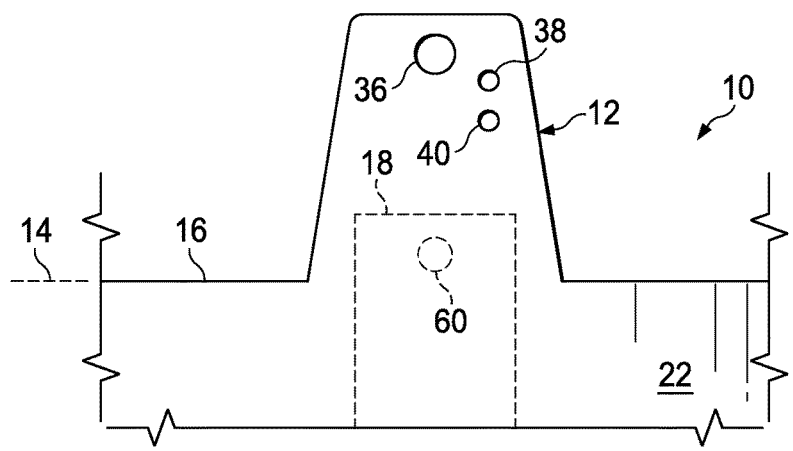
FIG. 3 is a detail view of the mounting of the well on the extension in the present invention.

In one embodiment constructed in accordance with the teachings of the present invention, the extension 12 can be a triangular shape as seen in FIGS. 2 and 3 with a base where the extension 12 meets the horizontal plane 14 of about 8 inches and a height above the horizontal plane 14 of about 10 inches. The extension 12 need only be large enough to mount the necessary components thereto, such as well 18. Brine tank 10 can have any desired dimensions. If cylindrical, for example, the tank 10 could have a diameter between about 18 to 24 inches, or even a diameter of about 50 inches, or larger. Of course, the tank 10 can be of any cross-section, such as circular, square or rectangular.

By use of the extension 12, structures currently attached to or through the wall of the brine tank below the horizontal plane 14, such as done in tank 100, can now be mounted to the extension 12 above the horizontal plane 14. For example, as seen in FIG. 3, holes 38 and 40 can be formed in the extension 12 for use of a brine refill valve and float. (the brine refill valve may have two valves, a small valve and a large valve, making two holes for passage of risers desirable) Only a single hole 36 need be formed in the extension 12 to receive an air check. This eliminates the need to drill holes through the brine tank itself for such attachments. In a typical current tank design, such attachments will typically cause 6 to 8 inches of the tank height to be lost when calculating capacity.

Further, an air check valve 70 can be mounted in the well 18 to replace the brine refill valve 112 and float 114 to perform the function of supplying or removing water from brine tank 10. The air check valve 70 would connect to riser 20.

The brine tank 10 can be provided with two or more extensions for greater flexibility, if desired. FIG. 2, for example, illustrates two extensions 12 and 12A. In the brine tank 10 illustrated in FIG. 2, extension 12A mounts an agitator assembly 80 which includes a well casing 82 that is mounted at its upper end to the extension 12A above the horizontal plane 14 and extends below the grid 106 into the holding space 122. An agitator motor 84 is mounted to the upper end of the well casing 82 which rotates an agitator shaft 86 extending downward through the well casing 82 and into the holding space 122. An impeller 88 is mounted on the end of the shaft 86 in holding space 122 so that operation of the motor 84 causes the shaft 86 and impeller 88 to spin and agitate the brine solution in the holding space 122, providing uniform mixing of the brine solution.

As can be readily understood, the accessibility of the well 18 is much enhanced over the accessibility of the well within the prior art design as illustrated in tank 100. The operator need no longer access the well from within the brine tank and the height of the tank 10 can be reduced significantly, providing safer accessibility for the operator.

Although only one embodiment of the invention has been illustrated in the accompanying drawings and described in the foregoing detailed description, it will be understood that the invention is not limited to the embodiment disclosed, but is capable of numerous rearrangements, modifications and substitutions in parts and elements without departing from the spirit and scope of the invention.

I claim:

1. An apparatus, comprising:
   a brine tank, the brine tank having a first portion for containing salt and a brine solution, the first portion having an upper edge defining a horizontal plane, the brine tank further having an extension mounted to the first portion and extending above the upper edge;
   a well, the well mounted to the extension of the brine tank above the upper edge of the first portion, the well in communication with the interior of the brine tank, a portion of the well extending above the horizontal plane.

2. The apparatus of claim 1 wherein the extension is molded integrally with the first portion.

3. The apparatus of claim 1 wherein the extension is separate from the first portion and is mounted to the first portion by adhesive, fasteners or hinges.

4. The apparatus of claim 1 wherein the first portion and extension are molded plastic or fiberglass.

5. The apparatus of claim 1 further including a lid, the lid mating with the upper edge of the first portion, the lid having an inset to accommodate the well.

6. The apparatus of claim 1 further including a riser, the riser extending within the well and passing through the extension above the horizontal plane.

7. The apparatus of claim 6 wherein the apparatus further includes a brine refill valve and a float, the brine valve and float within the well, the riser connected to the brine refill valve and the riser connected to the extension above the horizontal plane, the float being positioned in the well for vertical movement determined by the water level in the well, the float operating the brine refill valve to control water flow into the well.

8. The apparatus of claim 1 further including a salt platform mounted within the brine tank supporting a quantity of salt, the salt platform being at a predetermined height within the brine tank.

9. The apparatus of claim 1 further having at least two extensions molded to the first portion and extending above the upper edge.

10. A method for operating a brine tank having a salt platform therein supporting a quantity of salt, the salt platform at a predetermined height within the brine tank, comprising the steps of:

molding an extension to a first portion of the brine tank, the first portion containing the salt and brine solution, the first portion having an upper edge defining a horizontal plane, the extension extending above the upper edge of the first portion;

mounting a well to the extension above the upper edge of the first portion, the well in communication with the interior of the brine tank, a portion of the well extending above the horizontal plane.

11. The method of claim 10 further comprising the step of routing a riser from an air check valve at the bottom of the brine tank, through the well and to the extension to an exterior of the brine tank, the riser attaching to the extension above the horizontal plane without passing the riser through a wall of the first portion.

12. The method of claim 11 further comprising the step of molding at least one additional extension to the first portion of the brine tank, the at least one additional extension extending above the upper edge of the first portion.

13. The method of claim 12 further comprising the step of mounting an agitator assembly to the said at least one additional extension.

14. The method of claim 10 further comprising the step of transferring water to and from the brine tank through a riser, the transfer being controlled by a float positioned in the well for vertical movement determined by the water level in the well with the riser attached to the extension above the horizontal plane.

15. The method of claim 10 further comprising the step of molding the first portion and extension as an integral structure.

16. The method of claim 10 further comprising the step of mounting the extension to the first portion by a fastener, adhesive or hinges.

17. The method of claim 10 further comprising the step of positioning a lid over the upper edge of the first portion, the lid having an inset for passage of the well.

* * * * *